Patented Apr. 4, 1939

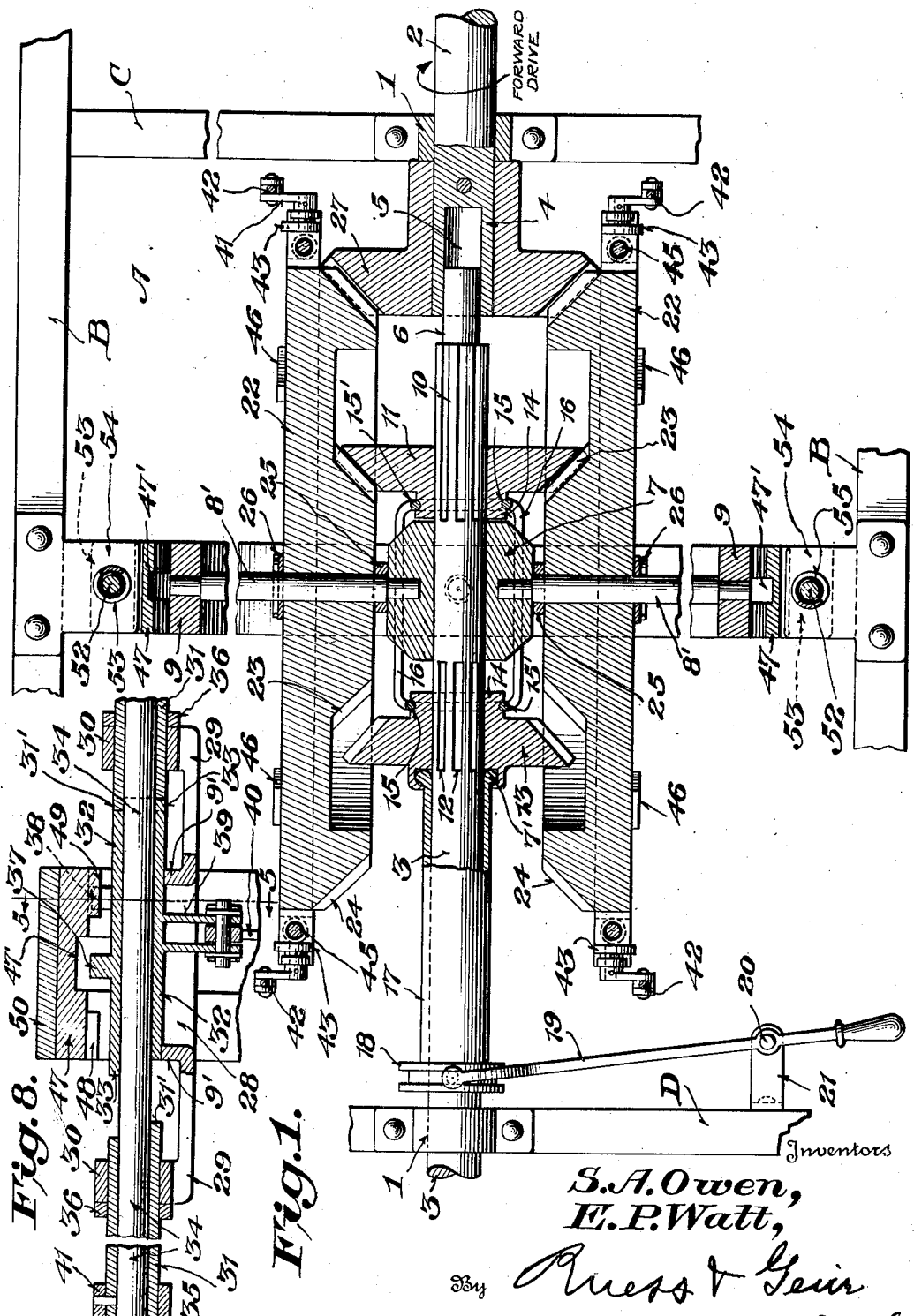

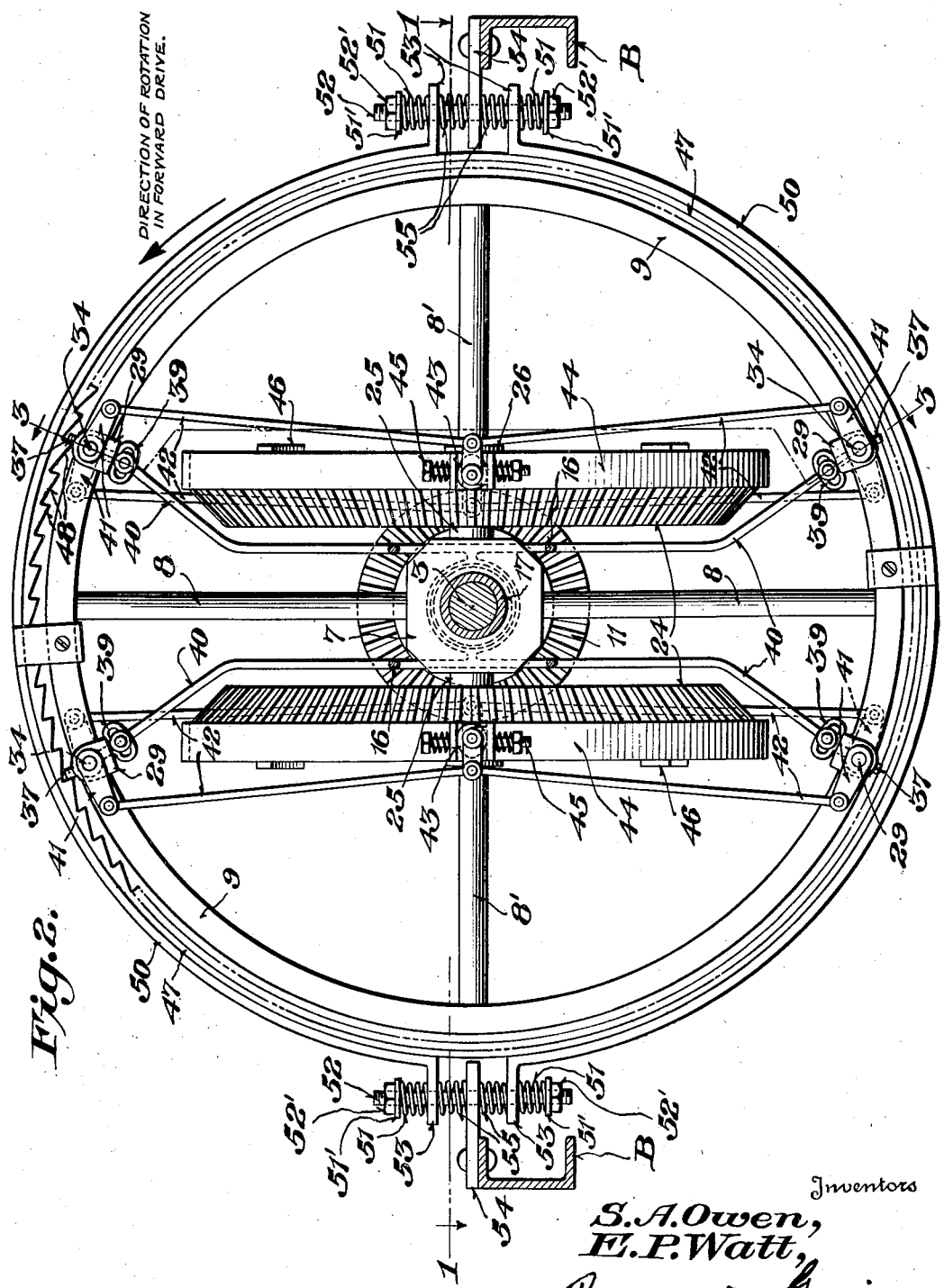

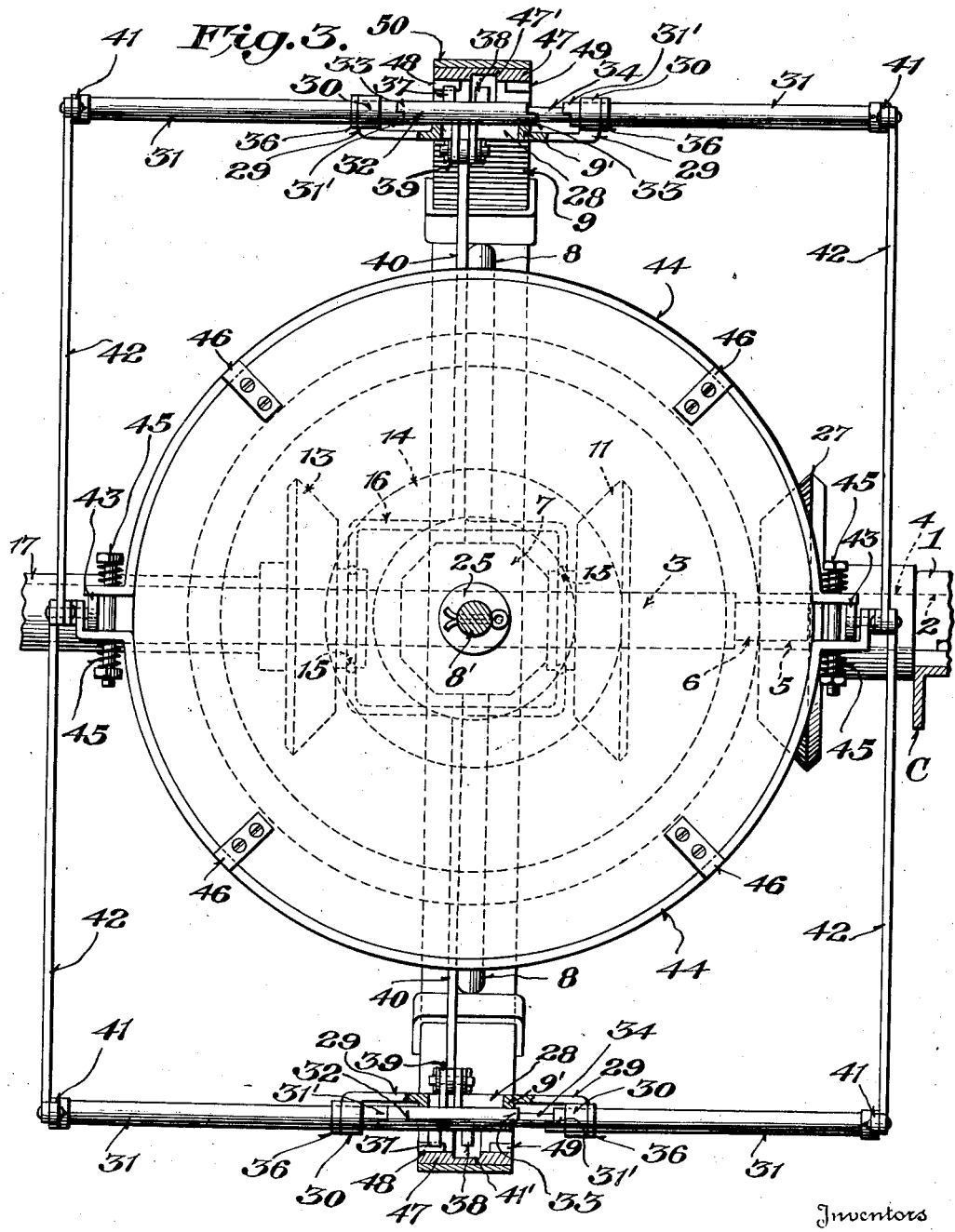

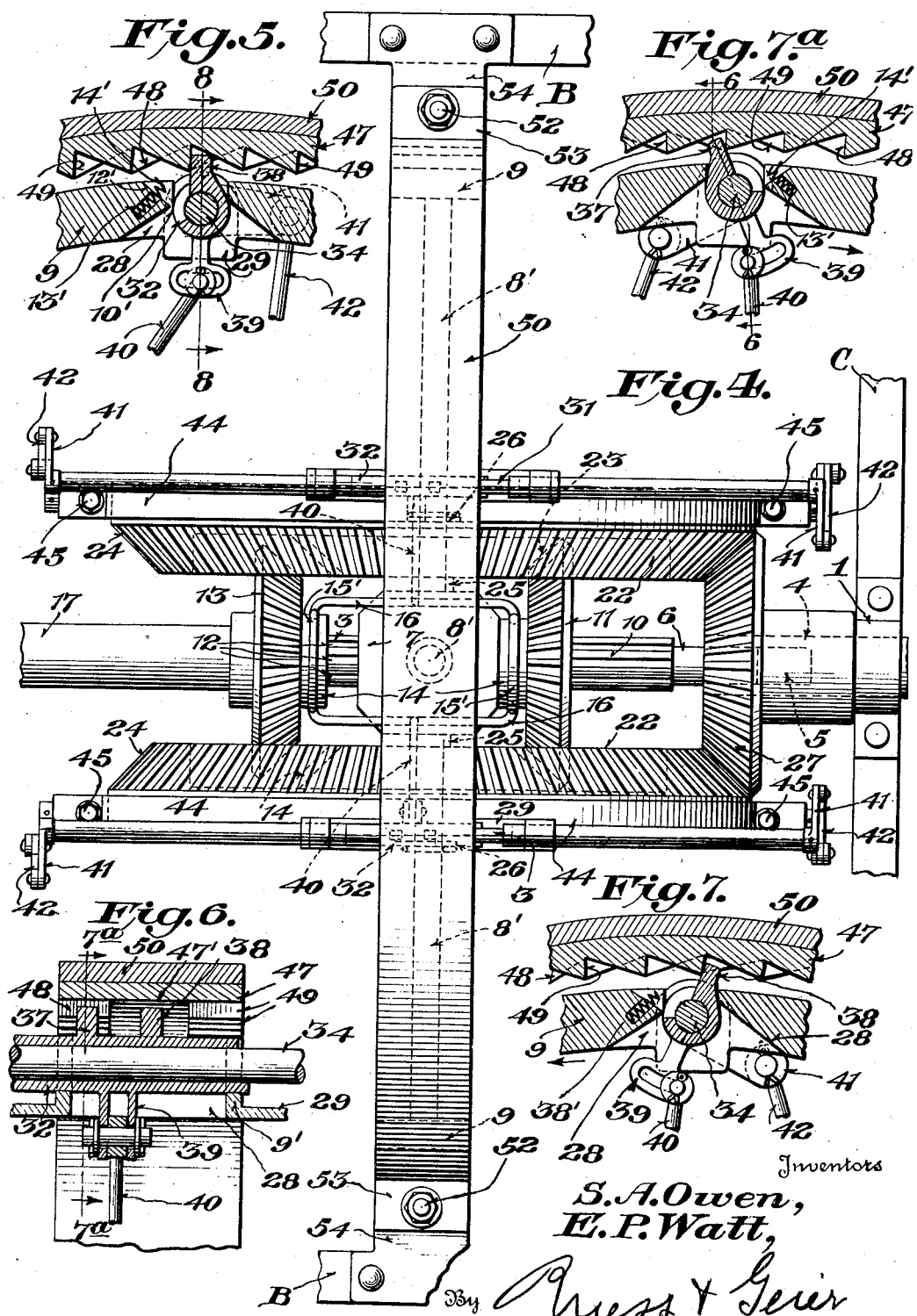

2,153,478

UNITED STATES PATENT OFFICE 2,153,478

GEAR TRANSMISSION

Samuel A. Owen and Everett P. Watt,
Albuquerque, N. Mex.

Application March 11, 1937, Serial No. 130,383

21 Claims. (Cl. 74—259)

This invention relates to improvements in automatic multiple ratio gear transmissions, and pertains more particularly to the use of such transmission upon automotive vehicles, although same may be readily adapted to various other uses or mechanisms.

The primary important object of this invention is to provide a mechanism of the above character which operates automatically under the pull of varying loads to actuate the speed changing mechanism, from low speed to direct drive or vice versa.

Another important object of this invention is to provide a mechanism of the above character having means to cause the direct drive portion of said mechanism to become inoperative when the weight of the load exceeds a predetermined pull upon the source of power, and to automatically cause the mechanism to operate in low speed until the pull of such excessive load is overcome.

Another important object of this invention is to provide a mechanism of the above character which requires no further attention other than the initial manual control to put same into operation.

A further important object of this invention is to provide a mechanism of the above character which automatically and gradually shifts from a low gear ratio to a higher gear ratio as the pull of the load decreases until said mechanism reaches a direct drive from the source of power.

A still further object of this invention is to provide mechanism of the above character which is simple in construction and operation and one which may be manufactured and marketed at a reasonable cost.

These and other objects and advantages will be apparent throughout the course of the following description and drawings, forming a part of the specification, in which, Fig. 1 is a horizontal section on line 1—1 of Fig. 2, showing parts in elevation;

Fig. 2 is a rear elevation of the mechanism showing the supporting structure in section;

Fig. 3 is a side elevation when viewed from the lower side of Fig. 1, with parts of the mechanism in section;

Fig. 4 is a top plan view with parts of the mechanism broken away;

Fig. 5 is an enlarged detailed sectional view, partly broken away, taken on line 5—5 of Fig. 8 showing the clutch band operating mechanism in inoperative position;

Fig. 6 is a sectional view on line 6—6 of Fig. 7a;

Fig. 7 is an enlarged detailed sectional view, partly broken away, similar to Fig. 5, showing the clutch band operating mechanism in its operative position;

Fig. 7a is a sectional view on line 7a—7a of Fig. 6;

Fig. 8 is a sectional view taken on line 8—8 of Fig. 5, with the gear clutch release mechanism shifted to the position for reverse operation of the transmission mechanism.

Referring in detail to the drawings, A designates generally a chassis of usual construction having longitudinal members B connected by spaced cross members C and D which together form a supporting structure for the mechanism about to be described. A bearing 1 is carried by each of the cross members C and D and are arranged to support a drive shaft 2 and driven shaft 3 in horizontal alinement. The free end of the drive shaft 2 is connected to a source of power (not shown) while the free end of the driven shaft 3 is connected to any preferred form of rear end or differential mechanism, (not shown). A clutch of any preferred type (also not shown) is interposed between the source of power and the drive shaft 2.

The drive shaft 2 extends rearwardly of the clutch and cross member C of the chassis a predetermined distance as at 4 and is provided with a rearwardly facing circular socket 5 formed to receive the cylindrical end 6 of the driven shaft 3 whereby to permit rotary movements of the shafts 2 and 3 relative to each other.

Mounted upon the driven shaft 3, for free turning movement thereon, is a hub member 7, to which is rigidly secured the inner ends of the two pairs of spaced radially extending stub-shafts 8 and 8' respectively which act to support at their outer ends the inner ring 9 of a twin over-running clutch mechanism, to be hereinafter more fully described.

The driven shaft 3, between the cylindrical end 6 and hub 7 is splined as at 10 so as to mount a forward drive gear 11 thereon for turning movement with and sliding movement on said shaft. Upon the opposite side of the hub 7, driven shaft 3 is splined as at 12 so as to mount a reverse gear 13 thereon for turning movement with and sliding movement on said shaft. The gears 11 and 13 are provided with opposed extensions 14 similarly grooved as at 15 to receive the opposite ends 15' of a shifting yoke 16 whereby to impart simultaneous selective sliding movement of said gears upon the driven shaft 3.

Slidably mounted upon the driven shaft 3 and having one of its ends connected, as at 7', to the reverse gear 13 is a sleeve member 17, the opposite end of said sleeve being provided with a grooved collar 18 formed to receive the forked end of a hand lever 19 fulcrumed as at 20 to a bracket 21 secured to cross member D of the chassis.

Each of the stub shafts 8', functions as a journal to support one of the gear members 22, each of which latter are provided with inner gear teeth 23 and outer gear teeth 24. The gear members 22 are spaced a suitable distance from hub 7 by means of washers 25 and are held against outward movement upon said shafts, under the urge of centrifugal force, by stops 26.

Keyed to the inwardly extending end 4 of the drive shaft 2, for rotary movement therewith, is a rearwardly facing bevelled gear 27, the teeth of which latter are in constant mesh with the outer gear teeth 24 formed on each of the gear members 22.

As previously stated, the outer ends of the pairs of stub shafts 8 and 8' support the inner ring 9 of a clutch mechanism. The inner ring 9 is formed with a plurality of spaced openings 28 arranged in pairs and extending radially therethrough. Each of the transversely extending side walls of each of the openings 28, is provided with a notch 10' having its bottom wall 12' disposed at an angle and formed with a socket 13' for the reception of one end of a coil spring 14'. Each of the notches 10' is staggered with relation to the notch formed in the opposite side wall of the openings 28.

Carried by the ring 9 and extending outwardly fom each side thereof at points alined with each of the openings 28 are bracket arms 29 having their upturned free ends formed to provide circular bearings 30. Supported in each of the bearings 30 is a rotary sleeve member 31 having its inner ends provided with a single tooth-like clutch element 31' of a width less than one-half the circumference of the sleeve member 31, the width of the elements 31' being material to the purpose to be later described.

The ring 9 is also provided with outwardly facing notched portions 9' at points alined with openings 28 to form bearings for a sliding and rotary clutch member 32, the opposite ends of which latter being provided with a tooth-like clutch element 33 complementary to elements 31' and of a width less than one-half of the circumference of the clutch member 32. The formation of the coacting tooth-like clutch elements 31' and 32 are such that same, when interengaged to perform their function, will only be effective in one direction depending upon the direction of movement of the vehicle and the pull of the load encountered. The purpose of the width of the tooth-like cltuch elements 31' and 32 will be hereinafter more fully described.

When the tooth 33 is disposed in the path of tooth 31', said sleeve member 31 is rotated in only one direction as the ring 9 rotates in an opposite directon due to encounterng an overload on the mechanism. When no overload is encountered the sleeve 31 is not rotated due to the fact that the teeth 31' and 33 are of a size less than one-half of the circumference of their respective carrying members, which permits limited play between the effective working faces of said teeth, thereby allowing lug 37 to ratchet past teeth 48.

Extending through each of the sleeve members 31 and the clutch member 32, is a shaft 34 having its opposite ends headed as at 35 to prevent outward movement of the sleeve members 31 thereon, while inward movement of said sleeve members is prevented by fixed collars 36 carried by said sleeve members outwardly of the bearings 30.

The clutch member 32 has formed thereon intermediate its ends, a pair of spaced alined outwardly extending lugs 37 and 38. The clutch member 32 also carries a depending slotted arm 39 to which is slidably connected one end of a rod 40, the opposite end of said rod 40 being connected to the shifting yoke 16 at substantially the central portion thereof, whereby sliding movement of the yoke 16, due to manual operation of lever 19 and sleeve 17, will impart corresponding sliding movement to the clutch member 32 upon the shaft 34.

Secured to each of the outer ends of each of the sleeve members 31 is a crank member 41, extending in a direction oposite to that of the corresponding crank member of the opposite sleeve, having pivotal connection with the outer end of a rod 42, the opposite end of the latter being connected to a cam 43. The cams 43 are disposed between and formed to open the several sections of a clutch band 44 against the action of springs 45 upon rocking movement of said cam. A clutch band 44 encircles the peripheral face of each of the gears 22 and normally engages and prevents rotation of the latter about the axis of their supporting stub shaft 8'. The sections of the clutch bands 44 are retained against axial movement relative to the peripheral faces of gears 22, by lugs 46 or other suitable retaining means.

Encircling the inner clutch ring 9 is an outer ring 47 provided on its inner face with two rows of inwardly extending circumferentially arranged and transversely spaced ratchet teeth 48 and 49, separated by an inwardly facing circumferential groove 47' for the reception of either of the lugs 37 or 38 which may be inactive, the teeth 48 having their operating faces disposed in opposite direction to those of the teeth 49.

Surrounding the ring 47 are a pair of pressure operated brake bands 50 normally urged into frictional engagement with said ring 47 by springs 51 carried by and adjusted by bolts 52 passing freely through the out-turned ends 53 of the bands and supporting members 54 secured to the side members B of the chassis. The opposite ends of the bolts 52 are threaded and provided with washers 51' and nuts 52'. Interposed between each of the out-turned ends 53 of the bands and the opposed face of the supporting member 54 are springs 55 adapted to counteract the pressure of the springs 51. Pressure of the brake bands 50 upon the outer face of ring 47 may be regulated to accommodate the mechanism to the pull of varying loads, by manual adjustment of the nuts 52' and washers 51'.

In operation, assuming it is desired to utilize the disclosed mechanism for driving a vehicle and to propel the latter in a forward direction, the interconnected forward and reverse gears 11 and 13 respectively, are shifted on shaft 3 to neutral position by means of the manual control lever 19 and the connected sleeve 17. Shifting of the gears 11 and 13 will cause simultaneous movement of the clutch members 32, through yoke 16 and rods 40, so as to position the lugs 37 and 38 carried by the clutch members 32, between and out of contact with the inner ends of the spaced and oppositely facing rows of circumferentially arranged ratchet teeth 48 and 49 formed on the inner face of the outer ring 47.

The motor (not shown) is then set in operation and caused to idle. The clutch (not shown), which may be of any preferred form and interposed at any point between the motor and the gear 27, is then disengaged and the hand lever 19 shifted in a direction so that the teeth of forward gear 11 are in mesh with the inner teeth 23 of gears 22. This latter movement of the gear 11 simultaneously causes shifting of the clutch members 32 through yoke 16 and rod 40 so as to position lug 37 in the path of the ratchet teeth 48, and clutch tooth 33 in the path of the complementary tooth 31' formed on rotary sleeve member 31, as shown in Figs. 2, 3, 6, and 7a.

After the foregoing operations have been completed, the clutch is then engaged and the power, which is applied to the drive shaft 2 in the proper direction (see arrow and legend "forward drive" Fig. 1), will thus be transmitted as follows: from drive shaft 2 through gear 27, ring gears 22, through gear 11 to driven shaft 3 and thence to the usual differential and rear wheels (not shown).

However, referring to Figs. 1, 2, 3, and 4, it will be noted that each of the peripheral faces of the ring gears 22 are encompassed by the multi-sectional clutch band 44 normally urged into binding engagement therewith by means of the springs 45. Interposed between each of the adjacent opposed ends of the sections comprising the clutch band 44 is the normally inactive cam 43 which is connected to the rotary sleeve members 31 by means of crank members 41 and rods 42.

As is usual in the operation of vehicles, it is necessary to start the forward movement of the latter in low gear, and when the motor increases its speed due to the decrease in load or pull to then place the mechanism in direct or high gear so as to prevent the motor overheating under heavy loads and to increase its efficiency. With the herein disclosed mechanism, the various necessary changes in the gear ratio is accomplished automatically.

It will be observed that with the parts in the position set forth in the foregoing description of the operation and as disclosed in Figs. 1, 2, 3, and 4, in initially starting the vehicle under the pull of a load, and the gears 27, 22 and 11 being locked together by means of the clutch bands 44, all of these members would have a tendency to back off from the load or rotate in a reverse direction as a unit about the axis of the driven shaft, carrying the ring 9 and the supported clutch sleeves 31 and 32 and there attendant mechanism.

The tendency of the mechanism when starting to reversely rotate or "back off" from the load is prevented by means of the lug 37 which, when carried along by ring 9 under the pull of the load will strike against one of the teeth 48 (see Fig. 6) and be forced into binding or locking engagement with a wall of the opening 28 as shown in Fig. 7a.

This movement of the lug 37, causes force to be applied through sleeves 32 and 31 and thence through crank arms 41 to rods 42 thus rotating cams 43 and thereby releasing the pressure of the multi-sectional clutch bands 44 so that gears 22 may freely rotate. This rotation of gears 22 causes the driven shaft 3 to receive its power from low speed gear 11. The vehicle will then continue to move in low gear until the pull of the load decreases whereupon the clutch bands 44 will again grip the periphery of the gears 22. This latter action causes the mechanism to rotate as a unit about the axes of the drive and driven shafts 2 and 3 respectively to propel the vehicle in direct or high gear, the lugs 37 meanwhile ratcheting past teeth 48 until the mechanism again encounters a load.

The pressure of the outer bands 50 upon ring 47 is such as to allow slippage between said bands 50 and ring 47, if due to accident the mechanism binds when excessive load is applied thereto.

To drive a vehicle in reverse gear, the hand lever 19 is shifted so as to cause gear 13 to mesh with inner teeth 23 of gears 22 and the lug 38 to be moved into the path of ratchet teeth 49 carried by ring 9. Otherwise the sequence of operations are the reverse of those described for propelling the vehicle in a forward direction.

It is to be noted that various changes and improvements may be made in accordance with the matter disclosed in the foregoing description and drawings without departing from the spirit and scope of the following claims.

What we claim is:

1. An automatic ratio gear transmission including a prime mover, a drive shaft adapted to be placed into and out of driving connection with the prime mover, a gear member connected to said drive shaft and operable therewith, a driven shaft, transmission gears rotatably supported upon the driven shaft and in constant mesh with the gear carried by the drive shaft, a gear member slidably supported on the driven shaft and movable therewith, means to shift the last named gear member into and out of operable engagement with the transmission gears, locking means for the transmission gears, means operable by the pull of a load to release the locking means to permit rotation of the transmission gears for driving the mechanism in low gear, control means to prevent retrograde movement of the transmission gears when the locking means is released, and means to cause engagement of said locking means to prevent rotation of said transmission gears and to place the mechanism in direct drive when the pull of said load decreases.

2. An automatic ratio gear transmission in accordance with claim 1 in which the locking means for the transmission gears are normally engaged with the periphery of the latter.

3. An automatic ratio gear transmission in accordance with claim 1 in which the locking means are in the form of frictional engaging elements which latter are in normal engagement with the periphery of the transmission gears.

4. An automatic transmission mechanism including a drive shaft, a driven shaft, transmission means connected to and constantly driven by the drive shaft, means to operatively connect the transmission means and the driven shaft, frictional locking means surrounding and normally engaging the transmission means, releasable means for the locking means adapted to be actuated by the pull of a load on the driven shaft so as to cause the latter to be driven at a low speed, control means to prevent retrograde movement of the transmission means when the locking means is released, and means to actuate the releasable means so as to cause engagement of the locking means with the transmission means, whereby to drive the driven shaft at high speed when the pull of the load on the latter decreases.

5. An automatic transmission mechanism in accordance with claim 4, in which said mechanism is supported in a frame, an adjustable member carried by the frame and surrounding the transmission means, and the control means to prevent retrograde movement of the transmission means being carried by the latter and cooperating with the adjustable member carried by the frame.

6. An automatic transmission mechanism in accordance with claim 4 in which the releasable means for the locking means is a lever and cam.

7. An automatic transmission mechanism in accordance with claim 4 in which the transmission means is composed of a pair of circular gears having plain peripheral faces, and locking means for the transmission means comprising a releasable frictional band for each of said gears.

8. An automatic transmission mechanism in accordance with claim 4, in which means is provided to permit slippage of the control means when an overload on the driven shaft is encountered.

9. An automatic transmission in accordance with claim 4, in which the control means is an over-running clutch.

10. An automatic transmission mechanism including a prime mover, a driven shaft adapted to be placed into and out of driving connection with the prime mover, a gear member connected to said drive shaft and operable therewith, a driven shaft, transmission gears constantly in mesh with the gear carried by the drive shaft and mounted for rotation thereby, a slidable gear member mounted on and rotatable with the driven shaft, means to operatively connect the last named gear member with the transmission gears, locking means for the transmission gears, means operable by the pull of a load on the driven shaft adapted to release the locking means so as to permit rotation of the transmission gears for driving the mechanism in low gear, control means to prevent retrograde movement of the transmission gears when the locking means is released, and means to cause engagement of said locking means to prevent movement of said transmission means so as to directly connect the drive shaft and driven shaft for driving the mechanism in high gear when the pull of the load on the driven shaft decreases.

11. An automatic transmission mechanism including a support, releasable pressure means carried by said support, a drive shaft, a driven shaft, transmission means connected to and constantly driven by the drive shaft, means to operatively connect the transmission means and the driven shaft, locking means for the transmission means, means for releasing the locking means adapted to be actuated by the pull of a load on the driven shaft so as to cause the latter to be driven at a low speed, control means associated with the releasable pressure means adapted to prevent retrograde movement of the transmission means when the locking means is released, and means to actuate the lock releasing means so as to cause engagement of the locking means with the transmission means whereby to drive the driven shaft at high speed when the pull of the load on the latter decreases, said releasable pressure means permitting relative movement of the control means so as to prevent breakage of the parts when an overload on the driven shaft is encountered.

12. An automatic transmission mechanism including a drive shaft, a driven shaft, transmission means connected to and constantly driven by the drive shaft, means to operatively connect the transmission means and the driven shaft, releasable locking means for the transmission means, means to release the locking means when the pull of a load on the driven shaft increases so as to cause the latter to be driven at a low speed, control means encircling the transmission means and to prevent retrograde movement of the latter when the locking means is released, means to actuate the lock releasing means so as to drive the driven shaft at a high speed when the pull of the load on the latter decreases, and means encircling and cooperating with the control means adapted to permit relative movement between the latter and the encircling means when the driven shaft encounters an overload while being driven at a low speed.

13. An automatic transmission mechanism in accordance with claim 12, in which the control means is an over-running clutch.

14. An automatic transmission in accordance with claim 12, in which the control means is an over-running clutch, and the means which encircles and cooperates with said control means comprises an adjustable member.

15. An automatic transmission in accordance with claim 12, in which the means that encircles and cooperates with the control means is an adjustable automatically releasable frictional member.

16. An automatic transmission mechanism including a drive shaft, a driven shaft, transmission means connected to and constantly driven by the drive shaft, means to operatively connect the transmission means and the driven shaft, releasable locking means for the transmission means, means to release the locking means when the pull of a load on the driven shaft increases so as to cause the latter to be driven at a low speed, control means encircling the transmission means and to prevent retrograde movement of the latter when the locking means is released, means to actuate the lock releasing means so as to cause engagement of the locking means with the transmission means so as to drive the driven shaft at a high speed when the pull of the load on the latter decreases, and releasable means cooperating with the control means to permit movement of the latter when the driven shaft encounters an overload while being driven at low speed.

17. An automatic transmission mechanism in accordance with claim 1, in which said mechanism is supported in a frame, an adjustable member carried by the frame and surrounding the transmission means, and the control means to prevent retrograde movement of the transmission means being carried by the latter and cooperating with the adjustable member carried by the frame.

18. An automatic transmission mechanism in accordance with claim 1, in which the releasable means for the locking means is a lever and cam.

19. An automatic transmission mechanism in accordance with claim 1, in which the transmission means is composed of a pair of circular gears having plain peripheral faces, and locking means for the transmission means comprising a releasable frictional band for each of said gears.

20. An automatic transmission mechanism in accordance with claim 1, in which means is provided to permit slippage of the control means when an overload on the driven shaft is encountered.

21. An automatic transmission in accordance with claim 1, in which the control means is an over-running clutch.

SAMUEL A. OWEN.
EVERETT P. WATT.